United States Patent
Ogawa et al.

[11] 3,899,701
[45] Aug. 12, 1975

[54] SMALL A.C. ELECTRIC MOTOR

[75] Inventors: Takashi Ogawa; Shunichi Sugiyama; Kiyonori Kida, all of Kawasaki, Japan

[73] Assignee: Fuji Denki Seizo Kabushiki Kaisha, Japan

[22] Filed: Aug. 9, 1973

[21] Appl. No.: 387,036

[30] Foreign Application Priority Data
Sept. 29, 1972 Japan............................. 47-97821

[52] U.S. Cl................... 310/40 MM; 310/257
[51] Int. Cl.................. H02k ; H02k 1/12
[58] Field of Search ...... 310/40 MM, 67, 257, 254, 310/154, 166, 162, 163, 44, 42, 179, 105, 103

[56] References Cited
UNITED STATES PATENTS

| | | | |
|---|---|---|---|
| 2,292,265 | 8/1942 | Carpenter | 310/44 |
| 2,595,870 | 5/1952 | Morganson | 310/40 MM |
| 2,758,231 | 8/1956 | Welter | 310/44 |
| 2,901,645 | 8/1959 | Sulger | 310/166 |
| 3,156,839 | 11/1964 | Wargo | 310/257 |
| 3,333,128 | 7/1967 | Kobayashi | 310/40 MM |
| 3,504,208 | 3/1970 | Rivers | 310/257 |
| 3,535,571 | 10/1970 | Heinzen | 310/257 |
| 3,603,826 | 9/1971 | Saretzky | 310/44 |

*Primary Examiner*—R. Skudy
*Attorney, Agent, or Firm*—Holman & Stern

[57] ABSTRACT

A small A.C. electric motor a stator core is provided in the form of a block made of sintered soft magnetic material, the stator core having a disk-shaped or ring-shaped yoke used as a common magnetic path and a plurality of tooth-like poles extending from the yoke in the axial direction of the stator core. Groups of windings are placed on the tooth-like poles, and a rotor is confronted by the tooth-like poles. In such an electric motor, the windings can be readily installed on the stator core.

The electric motor in another aspect may include a sleeve of soft magnetic material, the sleeve being provided on the tooth-like poles of the stator core in order to reduce higher spatial harmonic of electromotive force.

2 Claims, 8 Drawing Figures

PATENTED AUG 1 2 1975    3,899,701

SHEET 2

SMALL A.C. ELECTRIC MOTOR

BACKGROUND OF THE INVENTION

This invention relates to small A.C. electric motors such as hysteresis synchronous motors employed in audio equipments and more particularly to the construction of a stator in such an electric motor.

Heretofore, the construction of a conventional stator has been such that, after iron core plates blanked to form grooves for receiving windings have been put one on another, or stacked, to a thickness desired, the windings are put in the grooves thus formed.

In this connection, stacking the iron core plates and inserting the windings in the grooves of the core have been manually carried out. When the winding is inserted mechanically and automatically into the grooves provided in the stator core, generally it has resulted in the decrease of insertable winding area ratio to the groove area and the increase of the winding coil end length, and so that for a specified motor dimension, the problem has arisen that the motor has inferior characteristics for. Therefore manual insertion has been recommended. For the small motor with inner-rotor type, mechanical and automatic insertion has been sometimes even impossible. Since small A.C. electric motors are often manufactured on mass production, solution of the problem has been urgently demanded.

In order to solve the problems described above, electric motors which employ an outer rotor, that is, electric motors having a rotor on the outside of a stator have been proposed. However, provision of such electric motors is not a thorough solution for the problem because of the following reasons.

In such outer rotor type electric motors, since a rotor is arranged around the periphery of a stator, the inertia and weight of the moving parts including the rotor inevitably increase. Therefore, these electric motors are limited in use especially when employed in audio equipment. That is, these motors are not desirable from the viewpoint of increases in vibration, noise and leakage flux.

As is clear from a basic physical principle, the direction of an electric current is always interlinked with that of a magnetic flux induced by the flow of the electric current in all cases. Therefore, in order to effectively utilize the magnetic fluxes induced by the current, it is necessary to interlink a winding (that is, a path of current) and an iron core (that is, a path of magnetic flux) with each other.

In the conventional stator, its laminated stator core is in the form of a plate, that is, the stator core has a two-dimensional configuration, while its windings are arranged to interlink with the stator core, that is, the windings are positioned to be in parallel with the axis of the stator core, thus forming a three-dimensional arrangement with the stator core. This is one of the factors which make it considerably difficult to put the windings on the stator core.

The fact that the stator core, or the path of magnetic flux, has been formed two-dimensionally while the windings, or the path of electric current, has been formed three-dimensionally, is based on the following reason. Since the stator core is formed by stacking a number of iron plates, or it is a laminated core, the above-described arrangement of the core and the windings facilitate the manufacture of the stator.

However, it should be noted that, as long as the path of electric current is interlinked with the path of magnetic flux, a topological positional relationship between the stator core and its winding can be selected freely.

SUMMARY OF THE INVENTION

Accordingly, it is a primary object of this invention to overcome the above-described difficulties accompanying a conventional method of manufacturing a stator of a small A.C. motor.

More specifically, an object of the invention is to provide a stator of a small A.C. electric motor which can be manufactured by a mechanized or automated process.

Another object of the invention is to provide a small A.C. electric motor in which a higher spatial harmonic of magnetomotive force is reduced.

A still further object of the invention is to provide a small A.C. electric motor whose housing or casing is improved and simple in construction.

A particular object of the invention is to provide a stator core of a small A.C. electric motor in which windings can be readily placed on the stator core, and leakage flux is minimized.

The manner in which the foregoing objects and other objects are achieved by this invention will become more apparent from the following detailed description and the appended claims when read in conjunction with the accompanying drawings, in which like parts are designated by like reference numerals.

DETAILED DESCRIPTION OF THE INVENTION

Figure 1:
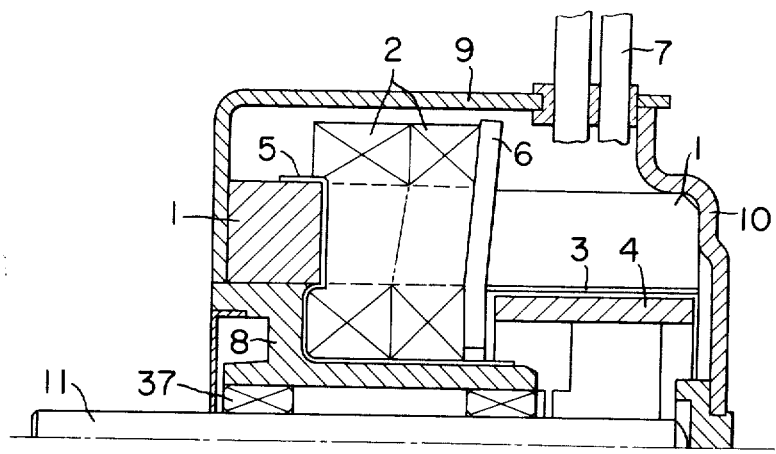
FIG. 1 is a side elevation, in half vertical section, of one example of the small A.C. electric motor according to this invention.

Referring first to FIG. 1, there is shown one example of the inner rotor type hysteresis synchronous motor according to the invention, which comprises: a stator core 1 on which windings 2 and a sleeve 3 are mounted; a rotor magnet ring 4 peripherally confronted and surrounded by the sleeve 3; an external housing 9; a cover 10; and a rotor shaft 11 cantilevered by a bearing housing 8.

The windings 2 are protectively supported by an insulator 5 and a coil insulation 6 and connected to lead wires 7. The stator core 1 is fixedly supported on the bearing housing 8 incorporating bearings 37 rotatably supporting the shaft 11.

Figure 2A:
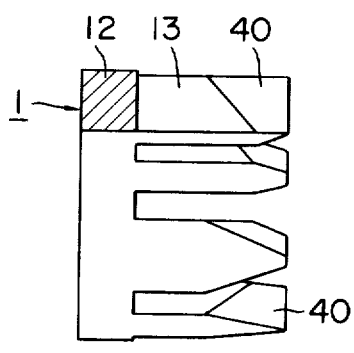
FIG. 2A is a side elevation of a stator core according to the invention, with the upper half in vertical section.
Figure 2B:
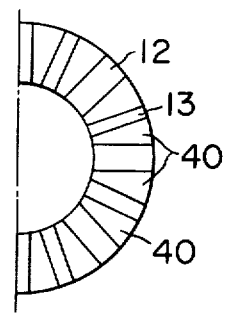
FIG. 2B is an end view of the stator core shown in FIG. 2A, showing one half thereof.

As is illustrated in more detail in FIGS. 2A and 2B, the stator core comprises a ring-shaped or disk-shaped yoke 12 used as a common magnetic path and tooth-like poles 13 extending parallelly to the stator axis from the yoke 12. These tooth-like poles 13 correspond to the teeth of a conventional stator core. A number of the tooth-like poles may be determined in the same way as in the determination of the number of the teeth of the conventional stator core.

The stator core 1 is in the form of a block of soft magnetic material produced by sintering and has a particular configuration which is convenient in the application of pressure to fine powder magnetic material in two axial confronted directions, that is, in sintering. The ends 40 of the poles 13 may be tapered as is shown in FIGS. 2A and 2B depending on characteristic of the electric motor to be manufactured. These ends 40 thus tapered are effective in reducing leakage fluxes and in introducing magnetic fluxes to the rotor while facilitating extraction of the stator core 1 from a press die.

Figure 3:
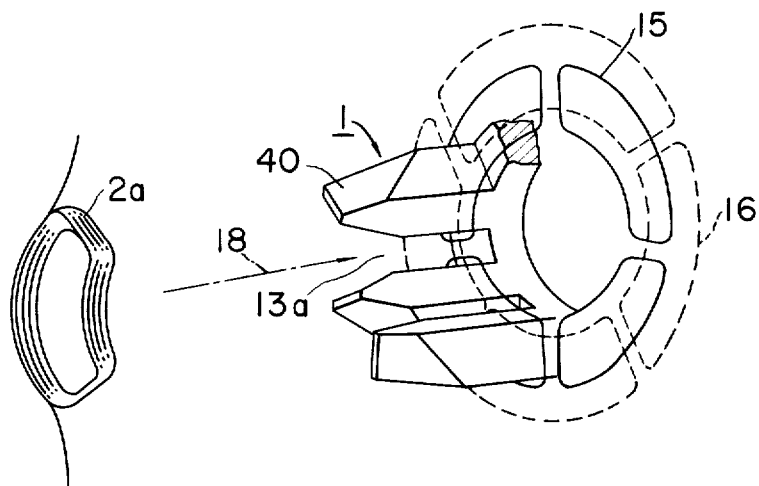
FIG. 3 is a perspective view of the stator core shown in FIG. 2A and 2B and windings, illustrating a method of placing the windings on the stator core.

Referring to FIG. 3, a method of placing the windings on the stator core will be described.

Windings 2a in a first group 15 which have been wound in accordance with a specification of an electric motor are carried in the axial direction of the core 1, or along the winding inserting line 18, and then inserted in respective winding receiving grooves, or in respective spaces 13a formed by and between the poles 13 of the core 1, thus forming a two-dimensional arrangement of the windings of the first group.

Similarly as in the insertion of the windings 2a of the first group 15, windings 2a of a second group 16 are inserted in other respective winding receiving grooves, or other respective spaces 13a formed between the poles 13 of the stator core 1, thus forming another two-dimensional arrangement of the windings 2a.

Since arranging or installing these windings 2a on the core 1 can be accomplished by only two steps, that is, carrying the windings in the axial direction of the core 1 and placing them on the core 1, the arrangement of the windings, that is, assembling the windings, and the stator core can be readily accomplished. Furthermore, since space necessary for the work to put the windings on the core is present outside the core, the windings can be readily removed into the core.

Relationships between electric current and magnetic flux circuits in the stator core of the electric motor constituted as described above will be described with reference to FIG. 4 in which the tooth-like poles of the stator core are arranged on a straight line for convenience in description of the relationships.

Figure 4:
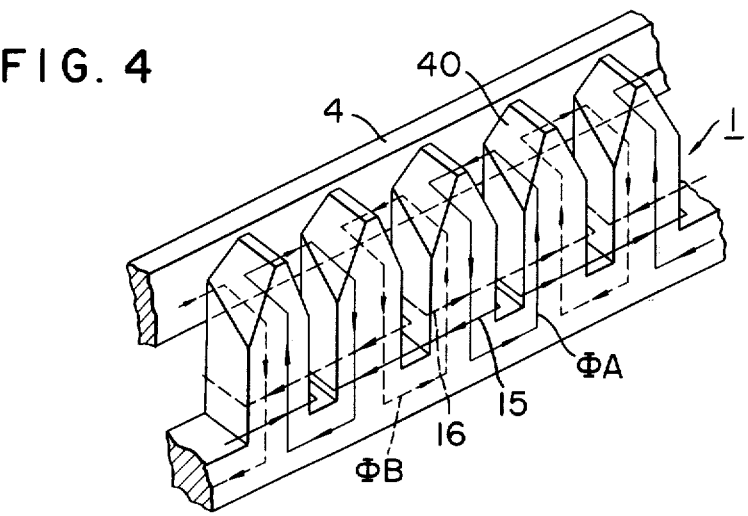
FIG. 4 is a perspective view of the stator core, shown in FIGS. 2A, 2B and 3, whose tooth-like poles are shown to be arranged on a straight line for convenience in description of relationships between directions of current and magnetic flux.

In FIG. 4, there are shown the stator core 1 and rotor magnet ring 4, and furthermore circuits ΦA of magnetic fluxes induced in the direction of the arrow mark by the flow, as indicated by the arrow mark, of electric current in the windings of the first group 15 and circuit ΦB of magnetic fluxes induced in the direction of the arrow mark by the flow, as indicated by the arrow mark, of electric current in the windings of the second group 16.

In this connection, as conducive to a full understanding of this invention, relationships between current and magnetic flux circuits of a conventional electric motor will be described with reference to FIG. 5 in which tooth-like poles of a stator core are also arranged on a straight line for convenience in description.

Figure 5:
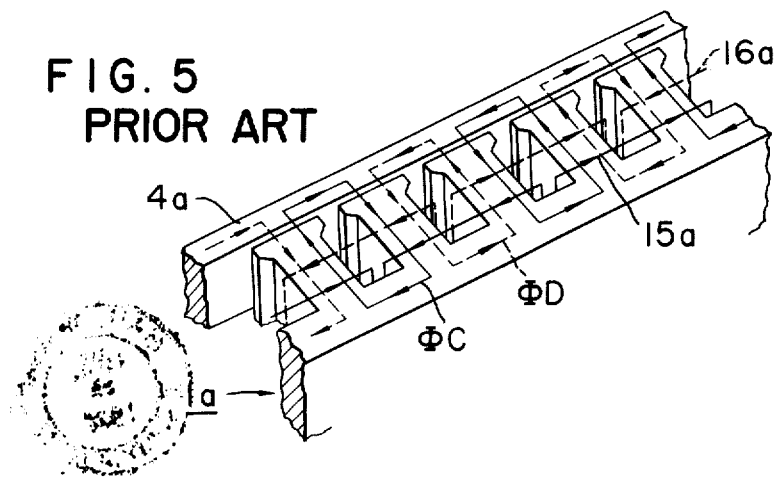
FIG. 5 is a perspective view of a conventional stator core whose tooth-like poles are also shown as being arranged on a straight line for convenience in description of relationships between directions of current and magnetic flux.

In FIG. 5, there are shown a stator core 1a, and a rotor magnet ring 4a, and furthermore circuits ΦC of magnetic fluxes induced in the direction of the arrow mark by the flow, as indicated by the arrow mark, of electric current in the windings of a first group 15a and circuits ΦD of magnetic fluxes induced by the flow, as indicated by the arrow mark, of electric current in the windings of a second group 16a.

The magnetic flux circuits of the electric motor of the invention are three-dimensional as is apparent from the circuits ΦA and ΦB shown in FIG. 4. However, as is clear from a comparison between FIGS. 4 and 5, the topological relationships between the both magnetic paths and the both windings are exactly the same as the conventional motor respectively. Therefore, in the same manner as in the case of the conventional electric motor, supply of electric currents which are different by 90° in phase from each other will cause a rotating magnetic field in the gap between the rotor and the stator.

The inner sleeve 3 shown in FIG. 1 is adapted to reduce the effect of a higher spatial harmonic of magnetomotive force in the rotating magnetic field and is therefore employed in accordance with the characteristics of the electric motor to be manufactured.

Figure 6:
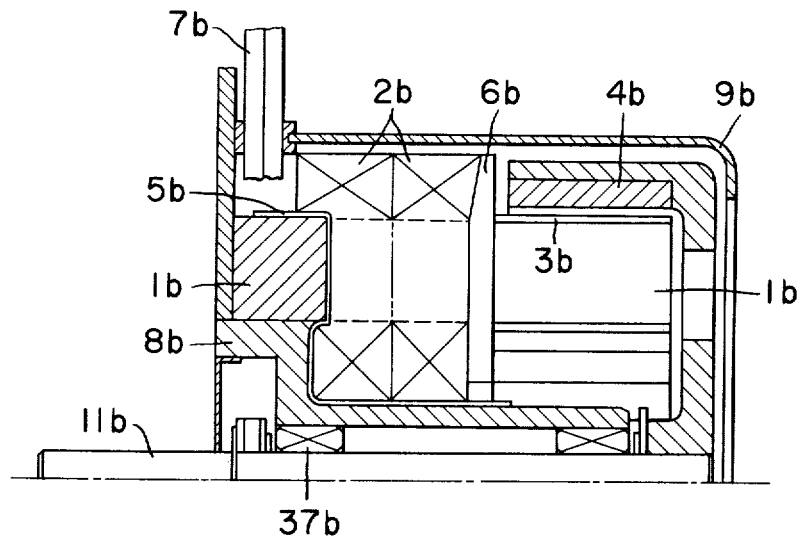
FIG. 6 is a side elevation, in half vertical section, of another example of the small A.C. electric motor according to the invention.

FIG. 6 shows one example of an outer rotor type, capacitor phase advancing, four pole, single phase A.C. hysteresis synchronous motor to which the present invention is applied. This motor comprises a stator core 1b, windings 2b, a sleeve 3b, a rotor magnet ring 4b, an insulator 5b, a coil insulation 6b, lead wires 7b, a bearing housing 8b, an external housing 9b, a shaft 11b, and bearing 37b.

In the electric motor thus constituted, the stator 1b is of the same construction as the stator 1 shown in FIG. 1. The peripheral portion of the stator core 1b is provided with an outer sleeve 3b as required. The rotor magnet ring 4b is provided outside the outer sleeve 3b with an air gap interposed therebetween.

The specific features and advantages of the stator described with respect to the first example exist also in the electric motor shown in FIG. 6. It should be understood that the same stator core according to the invention, may be employed both in inner rotor type electric motor and in outer rotor type electric motor.

In accordance with this invention as was described above, in order to facilitate or improve the method of installing the windings on the stator core, the positional relationships between the conventional stator core and the windings are modified, and in addition, the stator core is in the form of one solid unit, whereby the windings can be placed on the stator core from the axial direction of the stator core.

Accordingly, it becomes readily possible to mechanize or automate the work of installing the windings on the stator core according to the invention. That is, an important feature of the invention is the improvement in mass productivity and labor saving relative to the production of electric motors.

Figure 7:
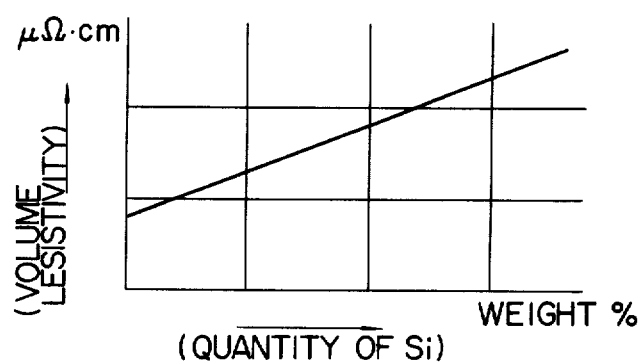
FIG. 7 is a graphical representation showing the relationship between volume resistivity of the stator core according to the invention and quantity of silicon contained in the stator core.

As was described previously, the stator core employed in the electric motor according to the invention is a block of soft magnetic material produced by sintering. However, this material core may be a sintered block of pure iron depending on the capacity of the electric motor to be manufactured or may be a sintered block of iron containing silicon and aluminum as additives in order to increase the volume resistivity of the stator core and thereby to reduce core loss incurred in the A.C. magnetic circuit and to improve the magnetic property of the core. Furthermore, the material of the core may be a sintered block having other elements as additives. In FIG. 7, the relationship between volume resistivity and quantity of silicon as an additive is indicated.

As was described previously with reference to FIGS. 2A and 2B, the ends of the tooth-like poles 13 of the stator core 1 may be tapered as indicated by reference numeral 40. The one end of every tooth-like poles 13 is so tapered partly toward the end that the side surface of the tooth-like pole is more spaced at the tapered portion than at the non-tapered portion from the surface of the adjacent pole. Since the stator core has been thus formed, that is, with the tooth-like poles thus tapered, leakage fluxes between the tooth-like poles 13 can be decreased, and installation of the windings on the stator core 1 can be readily accomplished, with the result that improvement in the mass production of electric motors can be achieved.

The stator core has a unique configuration according to this invention. Therefore, if the stator core is supported on the bearings which cantilever the shaft, the stator core may constitute a part of the bearing bracket, with the result that the number of components for the housing of the electric motor can be reduced, and the construction of the motor with therefore be simplified.

While this invention has been described with reference to hysteresis synchronous motors, it is evident that the invention can be applied to small induction motors with equally effective results.

We claim:

1. A small A.C. electric motor which comprises:
   a. a stator core in the form of a unitary block made of sintered soft magnetic material, said stator core having a disk-shaped yoke used as a common magnetic path and a plurality of tooth-like poles having winding-receiving slots formed therebetween, said poles extending from the periphery of said yoke in the axial direction thereof;
   b. a plurality of individual windings each placed surrounding the tooth-like poles within corresponding winding-receiving slots from the axial direction of the stator core;
   c. a rotor adjacent to said axially-extending tooth-like poles of the stator core; and
   d. sleeve means made of soft magnetic material formed about the peripheral surfaces of said tooth-like poles between said poles and said rotor for alleviating higher spatial harmonics of magnetomotive force.

2. The motor as set forth in claim 1, wherein each of said plurality of tooth-like poles includes a tapered portion at the outwardly extending end thereof, said tapered portion extending from a lesser degree on the side of said pole which is adjacent said rotor to a greater degree on the opposite side of said pole.

* * * * *